United States Patent

Kaaden et al.

[11] Patent Number: 6,167,005
[45] Date of Patent: Dec. 26, 2000

[54] TRACKING DEVICE WITH A COIL DRIVEN ACTUATOR AND A SENSOR COIL TO DETERMINE A POSITION OF THE ACTUATOR

[75] Inventors: Juergen Kaaden, Villingen-Schwenningen; Peter Mahr, Weiler; Gerhard Reiner, Villingen-Schwenningen, all of Germany

[73] Assignee: Deutsche Thomson-Brandt GmbH, Villingen-Schwenningen, Germany

[21] Appl. No.: 09/158,842

[22] Filed: Sep. 23, 1998

[30] Foreign Application Priority Data

Sep. 29, 1997 [EP] European Pat. Off. .............. 97402267

[51] Int. Cl.[7] ........................................................ G11B 7/09
[52] U.S. Cl. .................... 369/44.25; 369/44.32; 369/44.35
[58] Field of Search ............................ 369/44.13, 44.25, 369/44.32, 44.29, 44.35, 44.11, 44.34

[56] References Cited

U.S. PATENT DOCUMENTS

| | | | |
|---|---|---|---|
| 4,017,858 | 4/1977 | Kuipers | 343/100 |
| 4,302,830 | 11/1981 | Hamaoka et al. | 369/44.13 |
| 4,769,803 | 9/1988 | Yamamiya | 369/44.25 |
| 5,228,019 | 7/1993 | Yanagi | 369/44.28 |
| 5,764,605 | 6/1998 | Zucker et al. | 369/44.35 |

FOREIGN PATENT DOCUMENTS

| | | |
|---|---|---|
| 0620548 | 10/1994 | European Pat. Off. . |
| 2699723 | 6/1994 | France . |

OTHER PUBLICATIONS

Patent Abstracts of Japan vol. 12, No. 129 (P–692) Apr. 21, 1988 & JP 62 252531A (Seiko) Nov. 4, 1987.
Patent Abstracts of Japan vol. 15, No. 268 (P–1224) Jul. 8, 1991 & JP 03 088132A (OKI).

*Primary Examiner*—Thang V. Tran
*Attorney, Agent, or Firm*—Joseph S. Tripoli; Joseph J. Laks; Joseph J. Kolodka

[57] ABSTRACT

The invention relates to a tracking device in which a position of a coil driven actuator is determined using a sensor coil. A reference signal 12 having a determined voltage and frequency is fed to a driven coil. A position of the coil driven actuator is proportional to a distance between the driving coil and the sensor coil. The sensor coil produces an alternating voltage induced by an alternating magnetic field emitted by the driving coil. The alternating voltage is used to determine the position of the actuator.

8 Claims, 2 Drawing Sheets

TRACKING DEVICE WITH A COIL DRIVEN ACTUATOR AND A SENSOR COIL TO DETERMINE A POSITION OF THE ACTUATOR

FIELD OF THE INVENTION

The present invention relates to a tracking device in which a position of a coil driven actuator is determined using a sensor coil. Such a tracking device may typically be used in a recording and/or reading device in which a relative position between a writing and/or reading head and a data track is maintained in order to write and/or read data stored in the data track.

BACKGROUND OF THE INVENTION

The French Patent Nr 92 15473 discloses a data reading device in which inside of a reading head an expanded laser beam is used to read data stored on a magnetic tape. The magnetic tape supports a multiplicity of longitudinal tracks containing data. The expanded laser beam illuminates at least a part of the multiplicity of tracks simultaneously before being reflected and projected on a charge coupled device array (CCD). The CCD is divided in a number of cells each of which corresponds to a track read out with the expanded laser beam. For this reason a projection of the laser beam must be very precisely positioned on the CCD. It may happen that due to irregularities of the tracks on the magnetic tape, e.g. a transversal deviation the projection of the laser beam needs to be repositioned on the CCD. The disclosed device uses for this purpose a glass plate positioned between the magnetic tape and the CCD i.e. the laser beam crosses the glass plate before reaching the CCD. The glass plate may be moved in rotation around a rotation axis in such a way to reposition the projection of the reflected laser beam on the CCD. The glass plate is moved using an actuator which comprises an electromagnet and a permanent magnet. The electromagnet receives a tracking error signal from a servo loop which in a known manner determines errors in the positioning of the projection of the laser beam relative to the CCD. The movement and the position of the glass plate are solely controlled by the tracking error signal applied to the electromagnet. The lack of position information for the glass plate may be a drawback in some cases e.g. when a maximum and/or a minimum position of the glass plate and thus the activator need to be known. This is for example the case before a coarse positioning where the whole reading head (comprising a laser, optics to expand the beam, the glass plate, the CCD etc . . . ) is moved transversely to the tracks to read further tracks.

SUMMARY OF THE INVENTION

One aim of the present invention is to find a solution for a tracking device in which the position of the actuator may be easily determined.

A solution to the above mentioned problem is according to the invention found in a tracking device which enables a writing and/or reading head to write and/or read on a data track which comprises an actuator, a driving coil used to move the actuator using a magnetical force and according to a tracking error signal. The tracking device further comprises a reference signal generator which generates a reference signal having a determined voltage and frequency, the reference signal being fed to the driving coil without affecting a movement of the actuator, a sensor coil which through induction converts a magnetic field emitted from the driving coil and alternating at the determined frequency into an alternating voltage, a distance between the sensor coil and the driving coil varying proportionally to the movement of the actuator, processing means for converting the alternating voltage into a distance value which is representative of the distance between the sensor coil and the driving coil.

In a preferred embodiment the tracking device according to the invention comprises controlling means which produce a tracking signal for the driving coil as a result of a comparison of the tracking error signal and the distance value.

BRIEF DESCRIPTION OF THE DRAWINGS

The following description of embodiment examples will illustrate the present invention and its features referring to FIGS. 1 and 2 wherein FIG. 1 contains a schematical isometrical illustration of a tracking device, FIG. 2 contains a schematical illustration of a tracking device according to the invention.

DESCRIPTION OF THE PREFERRED EMBODIMENTS

Figure 1:
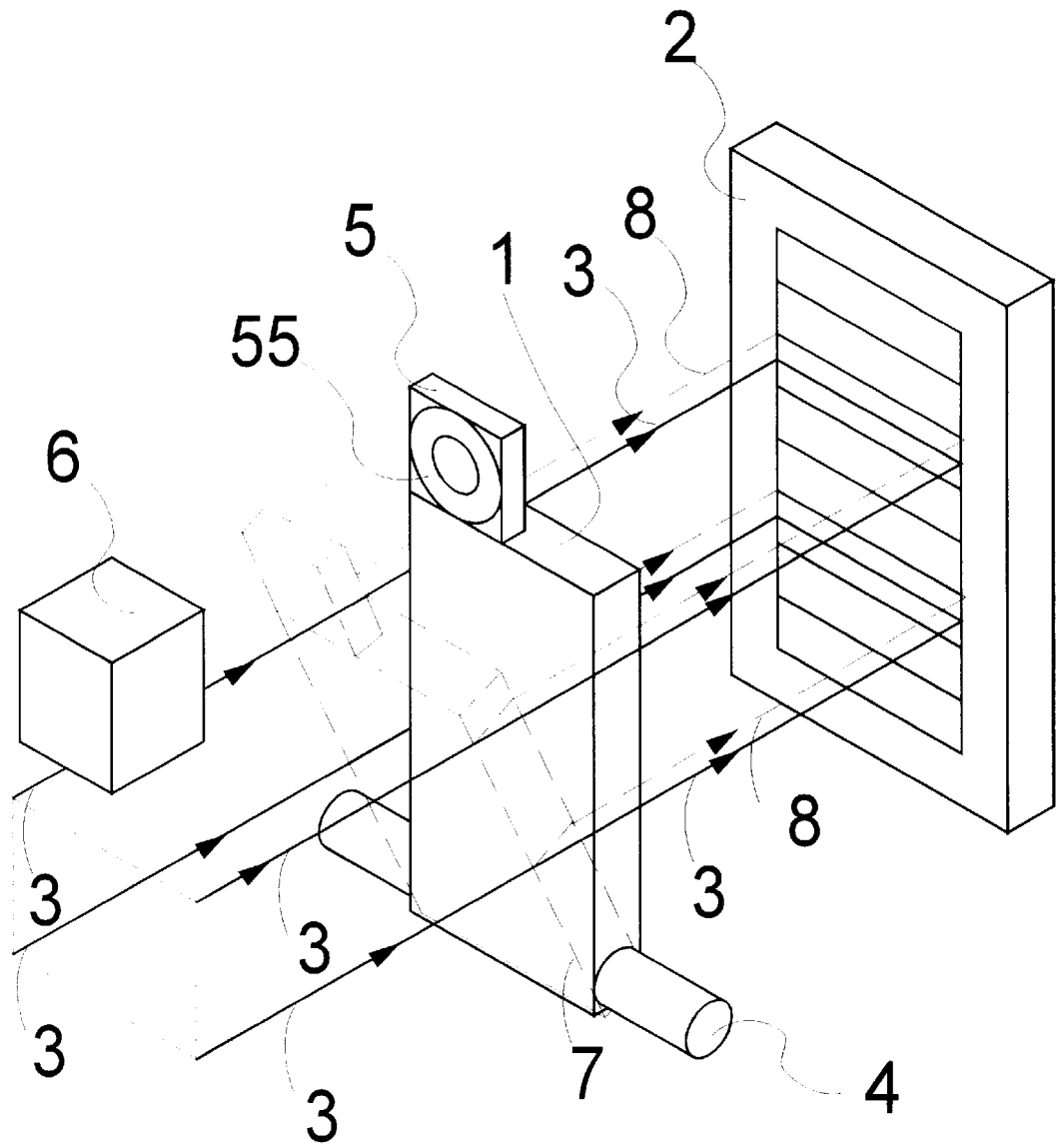
Figure 2:
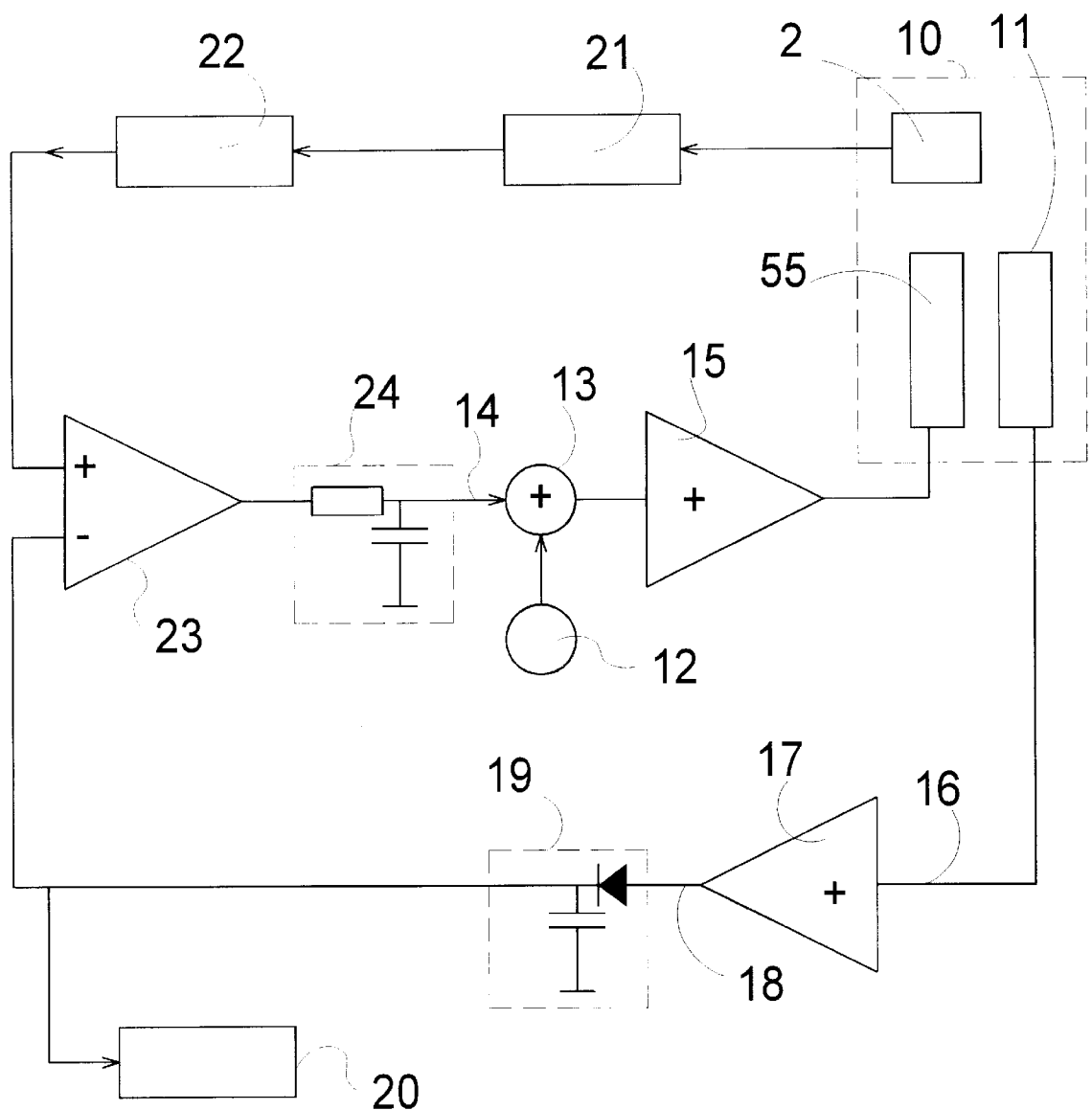

All along the following description and in both FIGS. 1 and 2 the same references will be used to designate the same parts. The embodiments and examples described are not limitative of the present invention and may well be modified by a man skilled in the art while remaining in the scope of the present invention.

FIG. 1 shows a glass plate 1 and a CCD 2 on which an expanded light beam 3 represented using continuous arrowed lines is projected. The glass plate 1 is rotated around an axis 4 using an actuator 5. The actuator 5 comprises driving coil 55 which on receiving a voltage applied from an outside generator (not shown) applies a force to the glass plate 1 as a result of the inductive force in the presence of a permanent magnet 6. The glass plate 1 may for example be positioned in a position 7 represented using dotted lines. In the position 7 the glass plate 1 deviates the light beam 3 in a light beam 8 represented in dotted arrowed lines. The light beam 8 is relatively to the light beam 3 shifted when it reaches the CCD 2. The light beam 3 is thus repositioned on the CCD 2.

A box 10 in FIG. 2 comprises the CDD 2, the driving coil 55 and other elements (not shown) described for FIG. 1. The box 10 further comprises a sensor coil 11 which may for example be mounted (referring to FIG. 1) between the driving coil 55 and the CCD 2. The sensor coil 11 registers variations of a magnetic field produced by the driving coil 55 when an external voltage is applied to the latter. Coming back to FIG. 2 a reference signal generator 12 generates a reference signal having a determined voltage and frequency. The reference signal is added to a tracking signal 14 by an adding device 13, subsequently amplified by an amplifier 15 and fed to the driving coil 55. The reference signal should not affect the movement of the actuator 5 when fed to the driving coil 55. The determined frequency may for example be 40 kHz. The sensor coil 11 registers a magnetic field emitted by the driving coil 55 and converts this magnetic field through induction in an alternating voltage 16 which is amplified in a second amplifier 17. An amplified alternating voltage 18 at the output of the second amplifier 17 is applied to a rectifier 19 to obtain a direct current (DC) signal which is representative of the distance between the sensor coil 11 and the driving oil 55. The DC signal may be converted in a read out device 20 to a position value for the glass plate 1 (not shown).

The sensor coil 11 and the use of magnetic induction to determine a position as such are known by a person skilled in the art. The present invention suggests to combine them with a servo loop positioning device of an existing tracking device.

A tracking processor 21 uses a signal from the CCD 2 to produce a tracking error signal 22 in a manner known from a person skilled in the art. The tracking error signal 22 is produced by the tracking processor at a relatively low frequency, e.g. 100 Hz. The tracking error signal 22 and the DC signal are fed to the entrances of a differential amplifier 23 to be subtracted from each other. The output signal from the differential amplifier 23 is filtered in a low pass filter 24 to obtain the tracking signal 14 at the relatively low frequency. The tracking signal 14 is fed to the driving coil 55 through the power amplifier 15 to position the actuator 5 and thus the glass plate 1 to a value indicated by the tracking error signal 22.

A position of the actuator given by the DC-signal is used together with the tracking error signal to achieve a precise repositioning of the actuator.

In a preferred embodiment some parts, eg the reference generator 12, the adding device 13, the amplifier 15, the second amplifier 17, the rectifier 19, the differential amplifier 23 and the low pass filter 24, are integrated in an integrated circuit (not shown).

In another preferred embodiment some of the parts, eg the reference generator 12, the adding device 13, the second amplifier 17, the rectifier 19, the tracking processor 21, the differential amplifier 23 and the low pass filter 24 are realized using digital signal processing (not shown). This reduces the costs related to hardware.

What is claimed is:

1. A tracking device to enable a writing and/or reading head to write and/or read on a data track comprising:

an actuator, a driving coil used to move the actuator using a magnetical force and according to a tracking error signal, a reference signal generator which generates a reference signal having a determined voltage and frequency, the reference signal being fed to the driving coil without affecting a movement of the actuator, a sensor coil which through induction converts a magnetic field emitted from the driving coil and alternating at the determined frequency into an alternating voltage, a distance between the sensor coil and the driving coil varying proportionally to the movement of the actuator, a processor for converting the alternating voltage into a distance value which is representative of the distance between the sensor coil and the driving coil, and a controller for producing a tracking signal for the driving coil as a result of a comparison of the tracking error signal and the distance value.

2. A tracking device according to claim 1, wherein the processor comprises a rectifier and the controller comprises a differential amplifier which subtracts the tracking error value and the distance value from each other.

3. A tracking device according to claim 1, further comprising an adding device to add the reference signal to the tracking signal, an amplifier to amplify an output from the adding device and a tracking processor to produce the tracking error signal, the controller comprising a low pass filter and the processor comprising a second amplifier for amplifying the alternating voltage.

4. A tracking device according to claim 3, wherein at least the reference signal generator, the adding device, the amplifier, the second amplifier, the rectifier and the differential amplifier 23 are integrated in an integrated circuit.

5. A tracking device according to claim 3, wherein the reference signal generator, the adding device, the second amplifier, the rectifier, the tracking processor, the differential amplifier and the low pass filter are realized using digital signal processing.

6. A tracking device according to claim 2, further comprising an adding device to add the reference signal to the tracking signal, an amplifier to amplify an output from the adding device and a tracking processor to produce the tracking error signal, the controller comprising a low pass filter and the processor comprising a second amplifier for amplifying the alternating voltage.

7. A tracking device according to claim 6, wherein at least the reference signal generator, the adding device, the amplifier, the second amplifier, the rectifier and the differential amplifier are integrated in an integrated circuit.

8. A tracking device according to claim 6, wherein the reference signal generator, the adding device, the second amplifier, the rectifier, the tracking processor, the differential amplifier and the low pass filter are realized using digital signal processing.

* * * * *